United States Patent [19]

Gilmore

[11] Patent Number: 4,865,720
[45] Date of Patent: Sep. 12, 1989

[54] DEBRIS SEPARATOR SYSTEM

[76] Inventor: Larry J. Gilmore, 17555 SE. Braden, Gladstone, Oreg. 97027

[21] Appl. No.: 140,936

[22] Filed: Dec. 28, 1987

Related U.S. Application Data

[63] Continuation of Ser. No. 841,168, Mar. 19, 1986, abandoned.

[51] Int. Cl.⁴ .............................................. B03B 7/00
[52] U.S. Cl. .......................................... 209/12; 209/45; 209/234; 209/629; 209/393
[58] Field of Search ................... 209/30, 31, 44.1, 45, 209/234–235, 314, 361, 393, 421, 629, 632, 633, 635, 643, 660, 672, 674, 675–679, 667, 695, 12, 645, 689

[56] References Cited

U.S. PATENT DOCUMENTS

| | | | |
|---|---|---|---|
| 760,590 | 5/1904 | Vodra | 209/674 |
| 1,431,814 | 10/1922 | Kanengieter | 209/44.1 |
| 2,100,738 | 11/1937 | Frevert | 209/30 |
| 2,321,166 | 6/1943 | Symons | 209/393 |
| 2,928,542 | 3/1960 | Mencimer | 209/45 |
| 3,587,851 | 6/1971 | Anderson | 209/45 |
| 3,682,301 | 8/1972 | Ross | 209/675 |
| 4,143,665 | 3/1979 | Griffin | 209/45 |
| 4,165,278 | 8/1979 | Jaffey | 209/45 |
| 4,190,526 | 2/1980 | Bachland | 209/421 |
| 4,301,930 | 11/1981 | Smith | 209/672 |
| 4,376,042 | 3/1983 | Brown | 209/672 |
| 4,430,210 | 2/1984 | Tuuha | 209/234 |
| 4,432,457 | 2/1984 | Sawa et al. | 209/632 |

FOREIGN PATENT DOCUMENTS

| | | | |
|---|---|---|---|
| 1028281 | 5/1953 | France | 209/677 |
| 244765 | 10/1969 | U.S.S.R. | 209/45 |
| 732027 | 5/1980 | U.S.S.R. | 209/393 |
| 1169757 | 7/1985 | U.S.S.R. | 209/643 |
| 425877 | 3/1935 | United Kingdom | 209/393 |
| 958739 | 5/1964 | United Kingdom | 209/314 |

Primary Examiner—Johnny D. Cherry
Assistant Examiner—Donald T. Hajec
Attorney, Agent, or Firm—Robert L. Harrington

[57] ABSTRACT

A debris separation system including a rock grizzly having relieved rails for inhibiting rock hang up, a vibrating grizzly having rods of alternating height for aligning limbs with the rod openings, a fines separating screen, and a rotary air separator for separating small rock and wood chips. The system is considered unique in its ability to distinguish rock and wood (log debris) by their physical characteristics. The vibrating grizzly rejects large rock while accepting long narrow limbs, and the rotary air separator separates rock and wood of the same general size and shape by reason of mass differential i.e. the more dense rock is less effected by air suction then the less dense wood.

12 Claims, 2 Drawing Sheets

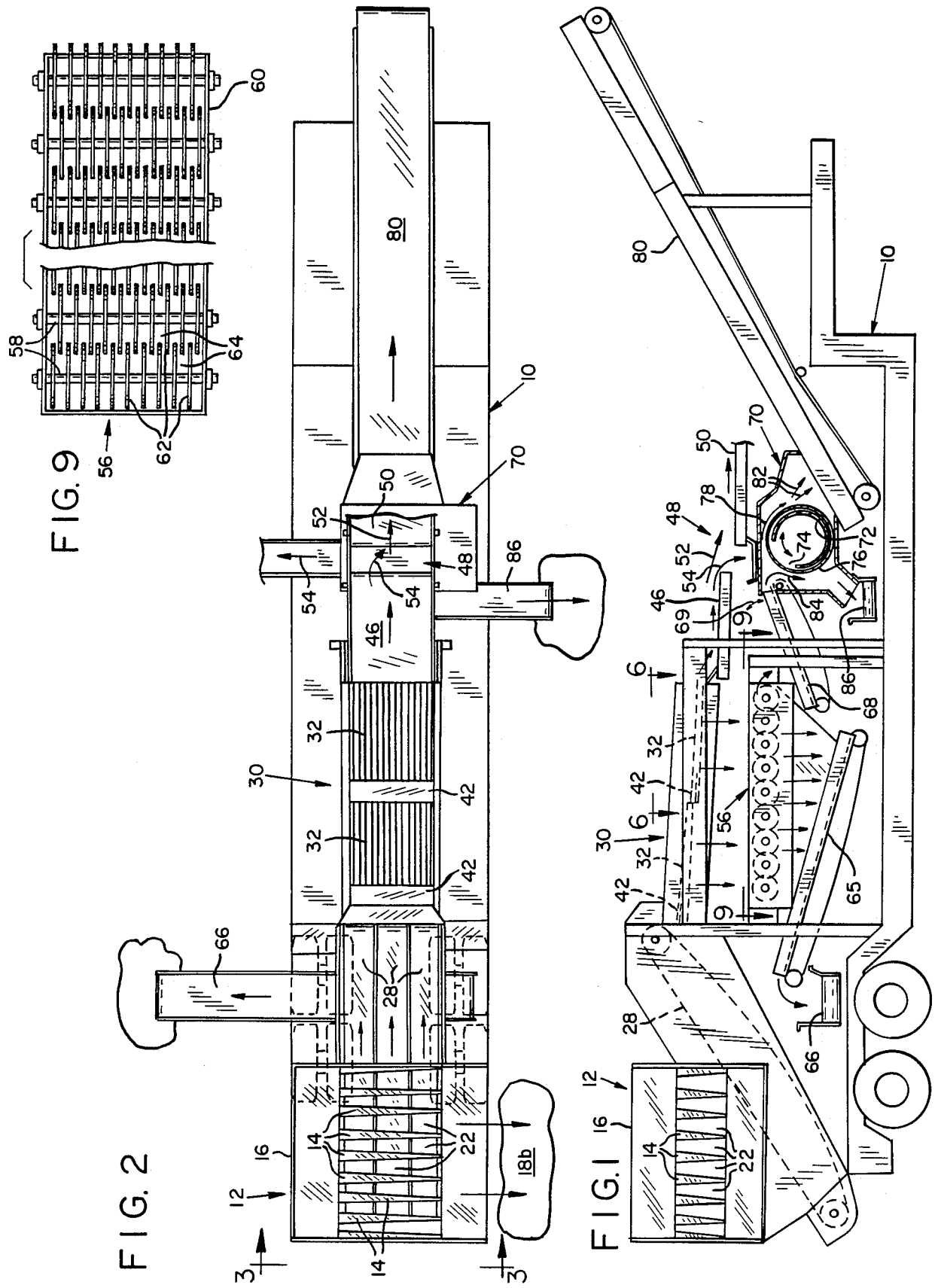

DEBRIS SEPARATOR SYSTEM

This application is a continuation of Larry J. Gilmore, application for U.S. Pat. Ser. No. 841,168, filed Mar. 19, 1986 now abandoned.

FIELD OF THE INVENTION

This invention relates to a system for separating an admixture of rock, wood, dirt and the like into it's various components.

BACKGROUND OF THE INVENTION

In a typical lumber mill, large numbers of logs are hauled in from the forest, stored in a graveled yard area, and as needed, processed through the mill. During the handling of the logs, wood chips, chunks and branches accumulate rapidly in the yard. It is necessary from time to time to remove this material. Commonly a bulldozer is employed to scrape the material away from the storage area and pile it to one side. This works until the pile grows to such enormity that steps have to be taken to dispose of it.

Disposal of the accumulated pile of debris (which now includes copious amounts of rock and dirt scraped up from the ground cover) is a problem. Landfills often will not accept the wood products, and dirt and rock does not burn, thus making it not acceptable as fuel. It is appreciated however, that if the materials are separated, the dirt and rock can be returned as ground cover, and wood chips can be accumulated and sold as fuel, thus converting a major disposal problem to a useful and/or profitable by-product.

BRIEF DESCRIPTION OF THE INVENTION

The present invention provides an improved system for breaking down the admixture of materials into acceptable size ranges of rock and wood material. Briefly, the preferred embodiment encompasses a multistage separator wherein:

(a) a primary screening member, comprised of sloped, spaced, truncated rails (referred to hereafter as the primary grizzly) separates out the largest of materials, primarily large rocks e.g. 12 inches or greater in diameter.

(b) a secondary screening member composed of multiple decks of sloped vibrating rods (referred to hereafter as the secondary or vibrating grizzly) that separates out materials of medium size e.g. 3.5 inches and greater. A unique capability of the vibrating grizzly is it's ability to accept long, narrow wood materials (tree limbs and long pieces of bark fibre).

(c) a disk screen that separates out the finer materials, e.g., dirt, grit or gravel, and fine bark (sometimes referred to as "fines"). The remaining materials consisting of an admixture of rock and wood chips of a size range from about 0.5 inch to 3.5 inches, are conveyed to a rotary air separator.

(d) a rotary air separator separates the rock from the chips, the latter being collected and disposed of as fuel.

DETAILED DESCRIPTION AND DRAWINGS

The invention will be more fully appreciated and understood by reference to the following detailed description and drawings wherein:

FIG. 1 is a schematic side view of the preferred debris separation system of the invention;

FIG. 2 is a top view of the system of FIG. 1;

FIG. 9 is a view taken on view lines 9—9 of FIG. 1.

Reference is made to FIGS. 1 and 2. The system described herein and it's various apparatus is shown mounted on a truck or trailer bed 10. However, it will be appreciated that the illustration is only to demonstrate the portability of the system which can as readily be a stationary installation.

In the illustrated system, it is assumed that the accumulated pile of debris includes a wide range of materials that may be found in a lumber mill yard. Included is large, medium and small rocks (gravel size), large and small tree limbs, tree bark and wood chips, fine chips (saw dust), grit and dirt (or mud if wet). In the different locations, some of the materials may not be a factor and thus the particular combination of the apparatus herein described is subject to change and modification.

The first station of the system is the rock grizzly station 12. The rock grizzly station is designed to accept whatever mixture of materials has been collected in the pile and to separate out only the very large materials, primarily large rocks having a dimension of 12 inches or greater.

Figure 3:
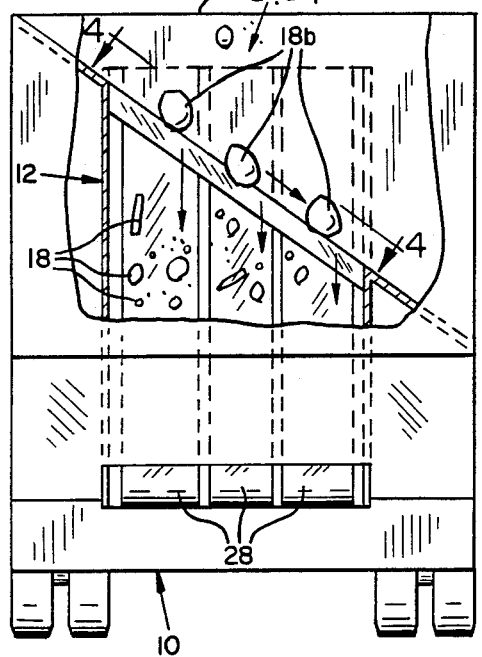
FIG. 3 is an end view of the rock grizzly as taken on view lines 3—3 of FIG. 2.
Figure 4:
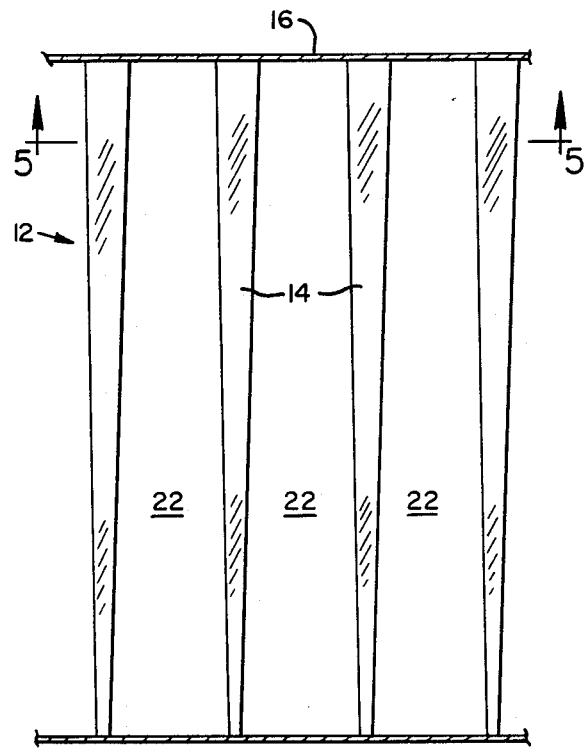
FIG. 4 is a plan view of the primary grizzly as taken on view lines 4—4 of FIG. 3.
Figure 5:
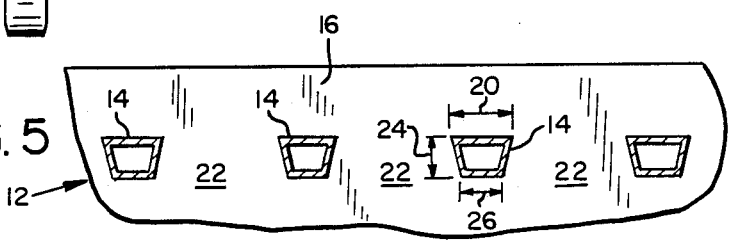
FIG. 5 is a section view as taken on view lines 5—5 of FIG. 4.

Referring to FIGS. 1-5 the rock grizzly 12 consists of spaced rails 14 mounted in a frame 16. As illustrated in FIG. 3, the mixture 18 is dumped onto the top of the grizzly (e.g., from a tractor scoop). The large rocks or boulders 18b are unable to fit through the spacings 22 between the rails and they roll down the incline of the rails, e.g., onto the ground. The remainder of the mixture 18 falls through the rails 14 and onto a conveyor 28.

Whereas rock grizzlies in general are not new, the rails in the present system are improved over the rails of known prior grizzly separators. See FIG. 4 and note the tapered length from the upper to the lower ends of the rail, and from FIG. 5, the tapered cross sections, top to bottom.

In a specific example of a rock grizzly, the rails 14 were 8 feet long and mounted at an angle of 45 degrees with centers 16 inches apart. For the configuration of the rails, (FIGS. 4 and 5) at the upper end, the top surface 20 of the rail was 4 inches wide, the thickness 24 was 3 inches, and the bottom surface 26 was 3 inches wide. At the lower end, the top surface 20 was 2 inches wide, the thickness 24 was 1 inch and the bottom surface 26 was 1 inch wide. It will be apparent that the spaces 22, between the rails, widens from the upper end to the lower end (from 12 inches to 16 inches) and also from the top surface to the bottom surface of the rail (an inch wider at the top than at the bottom). The advantage of the truncated rails is that rocks 18b of a size just barely too big to fit through the spacings 22 are less likely to get hung up between the rails, and when they do, they are easier to free. Previously, a rock of about the right size would slip partially through the rails and hang there. The grizzly would ultimately plug up and unplugging was a major problem.

Figure 6:
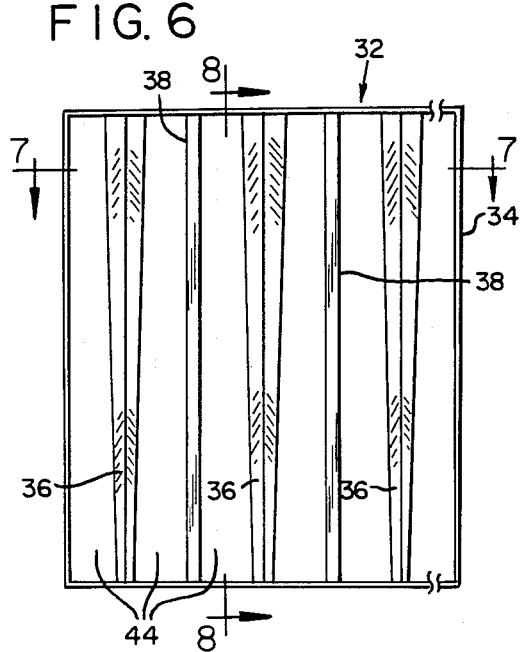
FIG. 6 is a plan view of a section of the secondary or vibrating grizzly as taken on view lines 6—6 of FIG. 1.
Figure 7:
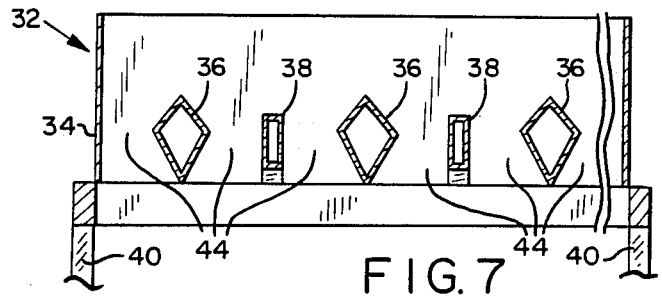
FIG. 7 is a section view as taken on view lines 7—7 of FIG. 6.
Figure 8:
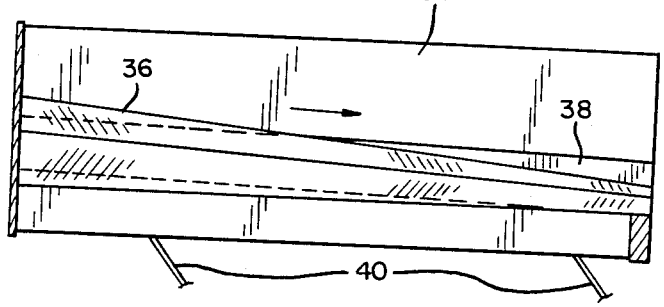
FIG. 8 is a section view as taken on view lines 8—8 of FIG. 6.

Again as illustrated in FIG. 3, the mixture 18 without the rocks 18b are dropped onto a conveyor 28 which conveys the mixture 18 to the second station 30 referred to as the vibrating grizzly. The vibrating grizzly 30 is comprised of one or more sections 32, two of such sections being illustrated in FIGS. 1 and 2. Referring now to FIGS. 5–8 illustrating one of the sections 32, a frame 34 is provided with multiple rods 36 having a diamond shaped cross section. The rods 36 are spaced from each other side to side in the frame 34. The rods 36 are tapered in width and height as illustrated in FIGS. 6 and 8. Interspersed between the rods 36 are rectangular rods 38. The rods 38 are of a consistent cross section throughout their length. As particularly viewed in FIG. 8, the tapered height of rods 38 are such that at the inlet end of each section, the diamond shaped rods 36 have a greater height then rod 38, and at the outlet end, the rectangular rod 38 has a greater height.

The sections 32 are supported in the system at a slight downward angle from inlet to outlet, and the support includes an angled vibrating spring support indicated at 40. As viewed in FIG. 1, the first section 32 is elevated slightly over the second section and each is preceded by an impact shelf 42.

In operation, mixture 18 is dumped from conveyer 28 onto the upper shelf 42 and then (by gravity and vibration) moved onto the upper section 32 of the vibrating grizzly. Spacings 44 between rods 36 and 38 are of course variable but will range in the order of about 3.5 inches. Thus materials smaller than 3.5 inches are dropped through the vibrating grizzly 30 onto a disk screen station 56 to be later described. Materials larger than 3.5 inches are vibrated down the rods from one section 32 to the other and then off the rods onto a conveyor 46.

The function of the dissimilar alternating rods 36 and 38 will now be explained. It is desirable to pass long narrow wood materials (limbs and bark fibre less than 3.5 inches thick) through the spaces 44 between rods 36 and 38. If the limbs are aligned with the spacings 44 they will fall through, if not, they are vibrated down the rods 36, 38. As the limbs proceed down the rods, if they lay cross-ways on the rods, they will start out by being supported on the rods 36 and then be shifted, by reason of the changing height differential, onto the rods 38 at the lower end. The limbs are dropped onto the second section 32 and that procedure is repeated. This action has been found to turn the limbs into an aligned position with the rods, where they will fall through the openings 44 (assuming a diameter of 3.5 inches or less).

A further benefit is realized in that the limbs or bark that are too large for spaces 44 are also aligned lengthwise and deposited in that manner onto conveyor 46. A further separation is then made possible by a conveyor interchange arrangement depicted in the drawings as station 48. A second conveyor 50 is spaced forward of conveyor 46 and slightly below it. Long limbs and bark will simply project over the end of conveyor 46 and tip onto conveyor 50 as illustrated by arrow 52. Rocks on the other hand will reach the end of conveyor 46 and fall through the spacing between the conveyor as indicated by arrow 54. The limbs 52 and rocks 54 are then collected in a conventional manner.

Reference is now made to the route of the material 18 passing through the vibrating grizzly and onto screening station 56. The disk screen assembly proposed for the screening station is illustrated in plan view at FIG. 9. A series of rotating shafts 58 (all rotating clockwise as viewed in FIG. 1) are mounted in spaced parallel arrangement in a frame 60. Individual disks 62 are mounted on the shafts 58 in interleaved arrangement to form openings 64. Material falling down between the disks 62 are worked down through the screen and deposited on a conveyor 65 which carries the material to a point of collection indicated at 66. This material is the fine material of the mixture 18 including dirt, grit, fine bark and small stones. The larger material of rock and wood (but less than 3.5 inches) are carried by the rotating disk 62 to another conveyor 68, to be conveyed to a rotary air separator 70.

The rotary air separator 70 is similar to the rotary air separator described in U.S. Pat. No. 4,165,278 issued to Irving Jaffey. Basically, the separator 70 includes an inner air chamber 72 which is connected to an air source (not shown) for drawing air from the chamber. The chamber is fully enclosed except for an upper opening or slot 74. Thus air is drawn from outside the chamber through slot 74. A cylindrical screen 76 surrounds the air chamber 72. The screen is mounted for rotation about the air cylinder 72 in the direction indicated by arrow 78.

The admixture that is carried by conveyor 68 is dumped onto the rotating screen 76 in the vicinity of the start of the opening 74. The air being drawn through the opening 74 sucks the lighter material, i.e., wood and bark to the screen and it is carried over the top of the separator as indicated by arrow 78. The air suction is released as the opening 74 is traversed and the wood material falls from the screen onto a conveyor 80 (see arrows 82). Conveyor 80 conveys the wood material to a collection area where it is collected for use as fuel.

Heavy materials, i.e., rock, that are dropped onto the rotating screen are not affected by the air suction and they fall off the front of the screen, i.e., between the separator and conveyor 68 as indicated by arrow 84. This rock is collected at position 86 and used e.g., for ground cover.

A number of variables may affect the functioning of the rotary air separator and thus the separator is provided with a number of adjustments. As illustrated, the materials from conveyor 68 are dumped on the rotating screen 76 at a position (in FIG. 1) of about 10 O'Clock. This can be adjusted, e.g. 9 to 12 O'Clock as indicated by doubled headed arrow 69 by re-positioning the exit end of the conveyor 68. Because the path of the screen in this upper quadrant of upward movement of the screen is convexly curved in an inclining direction, the screen at the 9 o'clock position provides no support for the materials and the 12 o'clock position provides full support. In between these positions, the screen provides increasing support. Thus, the effect of gravity pull on the materials is increasingly diminished as the position of deposit is adjusted upwardly to the screen apex at the 12 o'clock position. Such adjusting performs a function in cooperation with the air flow to discriminate between the desired accepted and non-accepted materials being screened due to their mass. The distance between conveyor end and rotating screen is also adjustable as may be desired to insure that none of the rock materials are carried over the top of the separator. The chamber 72 is angularly adjustable to adjust the position of the opening 74 as indicated by the double-headed arrow at the chamber inlet. The speed of the screen can be increased or decreased as can the air movement generated by the air source.

Operation

In operation the truck or trailer bed 10 is hauled by a tractor to the site of a debris pile consisting of a mixture of large and small rock, gravel, dirt, sawdust, wood chips and wood chunks.

The debris is scooped up by a tractor scoop and deposited on the grizzly of station 12 (FIGS. 1, 2 and 3). The large rock (12 inches or greater) roll down the angled grizzly rails 14 where they are collected and disposed of (e.g., as landfill). It is to be recalled that the rails 14 are relieved in length and thickness to avoid the problem of having the rocks hang up between the rails.

The remainder of the debris falls through the rails 14 and is conveyed by conveyor 28 to the vibrating grizzly station 30. In station 30, the grizzly rods are spaced to pass material of about 3.5 inches and less. The larger materials are vibrated down the rods to a conveyor 46. During the vibration movement, by reason of the rod configuration (FIGS. 6, 7 and 8) the long wood (branches and bark) are vibrated into alignment with the rods. The long wood that is less than 3.5 inches in cross section will fall through the rods. The larger long wood or bark will be deposited onto conveyor 46 in a lengthwise position. This long wood is then passed to conveyor 50 and the rocks drop between the conveyors for collection and disposal. The long wood can be then directed to a chipper or hammermill station (not shown) and added to the wood chips from the air separator, e.g., onto conveyor 80.

The material that passes through the vibrating grizzly is dropped onto a screen. As illustrated, this is a disk screen through which mud, dirt, grit, gravel and very small chips are passed, collected and disposed of as land fill or soil use. The materials not accepted by the screen are conveyed to the rotary air separator. This material will thus consist of material larger than e.g., a half inch, and smaller than e.g., 3.5 inches (including long wood with a 3.5 inch or less cross section). Primarily these materials are wood chunks/chips and rock within that size range.

The rotary air separator 70 is adjusted to separate the rock from the wood products based primarily on the mass differential of these products, i.e., the air suction will draw the wood to the rotating screen for conveyance over the top and onto conveyor 80. Rock will simply fall off the end of the conveyor 68 unaffected by the suction and be collected for use as ground cover. The wood material collected by conveyor 80, (which is not suitable as ground cover or landfill), is very acceptable as fuel.

Statement of Invention

The individual apparatus within the system are generally known. Rock grizzlies in general (as indicated for station 12) are old and thus specific explanation and description of the general construction is not necessary. The improvement to the rail configuration is provided and these can be readily substituted for rail configurations in the prior structures by manufacturers of the equipment.

The conveyor systems between stations are also well known apparatus and no further explanation as to any of these conveyor systems is necessary. To the contrary, such additional explanation would generate confusion and undue complexity of the disclosure herein.

The use of vibrating screens is common but the vibrating rod sections of the vibrating grizzly described herein is believed novel. Prior systems have not been able to successfully provide for re-positioning of long narrow wood materials so as to enable their separation from rock. The configuration of the alternate rods of the vibrating grizzly accomplishes this objective.

The disk screen at station 56 is a known apparatus available from Duraquip, Inc. of Portland, Oregon. Whereas this apparatus is considered preferable, it is recognized that other available screening apparatus (to screen out the "fines" debris) may be acceptable. As indicated, the rotary air separator (minus certain of the adjustments) is disclosed in the existing Jaffey Patent identified above. However, such an air separator has not previously been incorporated into a multi-stage system.

Other than the modifications noted, the invention encompasses the accumulation and combination of apparatus to accomplish the problems of lumber yard debris separation. In particular, it is the separation of rock of various sizes, from wood of various sizes, that is the problem encountered and the solution provided by the invention. Thus the slot type screening provided by the vibrating grizzly separator, separates medium size material (e.g. rocks and wood of 3.5 inches and less) from larger material, but also includes long narrow materials which is peculiar to log debris. (It should be appreciated that wood, as the term is used herein, refers to debris resulting from log handling, i.e., unprocessed logs from which broken off bark and limbs compose a major portion of the debris.)

In the rotary air separator, the rock and wood are again separated by physical characteristics, i.e., by mass differential. In summary, the combination of apparatus of the present invention separates wood and rock because of physical peculiarities, i.e., wood being long and narrow as differentiated from the more spherical shapes of rock, and wood being lighter in mass than the more dense rock.

The system in general is subject to numerous variations and modifications while encompassing the basic concepts of the invention. Accordingly, the invention is not to be restricted to the specific embodiments disclosed but is intended to be encompassed by the definition of the claims appended hereto.

I claim:

1. A debris separation system for separating log debris from rock which comprises;
   a combination of separating apparatus wherein a first apparatus separates by size and shape, and a second apparatus separates by mass,
   said first apparatus including a slotted screen having slot openings that permits passage of materials having at least one dimension smaller than the slot openings, and means for shifting materials placed on the screen for aligning the smallest dimension with the slot openings whereby certain of said materials will pass through the slot openings as materials accepted by the slotted screen, and the remainder will be shifted down and off one end as materials rejected from the slotted screen,
   a first conveyor aligned with the movement of materials rejected from the slotted screen for receiving, conveying, aligning and depositing off one end thereof, said materials rejected from the slotted screen, a second conveyor having a materials-receiving end spaced horizontally from and below said one end of the first conveyor whereby any rocks and misaligned material contained in said materials rejected from the slotted screen will fall between the conveyors and the remaining materials aligned with the conveyors, will be passed from the first conveyor to the second conveyor, said second apparatus including a cylindrical screen mounted for rotative movement about its cylindrical axis whereby the screen moves in a curved path through an upper quadrant from a vertical to a horizontal position, an air source generating air flow through the upper quadrant of the screen whereby materials having a defined mass and heavier, when deposited on the screen at the upper quadrant will be more greatly affected by gravity than the air flow and fall off of the screen, and materials of a mass lighter than the defined mass will be more greatly affected by air flow than gravity and be drawn to the screen and moved thereby across the upper quadrant of the screen, and conveyor means for receiving and conveying materials passed through the slot opening of the first apparatus for deposit on the upper quadrant of the cylindrical screen.

2. A debris separation system as defined in claim 1 wherein said slotted screen is comprised of spaced parallel rods length-ways of the path, and alternating ones of the rods have sides that are angled inwardly, top to bottom, for expanding the spacing downwardly between rods.

3. A debris separation system as defined in claim 2 wherein alternating ones of the rods have sides that are angled inwardly lengthwise toward the lower position and thereby increasing the spacing between the rods.

4. A debris separation system as defined in claim 3 wherein said first apparatus comprises multiple slotted screen sections, each slotted screen section comprises of said spaced parallel rods.

5. A debris separation system as defined in claim 4 wherein each of said slotted screen sections is preceded by an impact shelf, and wherein successive screen sections are offset in succeeding lowered positions from materials receiving to materials rejecting positions.

6. A debris separation system as defined in claim 1 including a rock grizzly preceding the first apparatus in the system, said rock grizzly comprised of spaced parallel rails angled downwardly from one end to the other, alternating ones of said rails having sides that are angled inwardly top to bottom to expand the distance between rails in a direction through the rails, and alternating ones of the rails having sides angled inwardly upper to lower end to expand the distance between the rails along the length of the rails, and conveyor means for conveying materials passed through the rails to the upper end of the screen of the first apparatus.

7. A debris separation system as defined in claim 1 including a fines separation screen for receiving the materials passing through the slotted screen of the first apparatus, said fines separation screen passing therethrough the fine materials of the debris including dirt and sawdust, and conveyor means for conveying materials rejected by said fines separating screen to the second apparatus.

8. A debris separation system as defined in claim 1 wherein said second apparatus comprises an air chamber inside the cylindrical screen and having an opening positioned adjacent the moving screen in the upper quadrant thereof, said air source drawing air through the opening in the chamber and thereby drawing materials in the path of the air flow toward the screen to be rotated thereby over the top of the cylinder.

9. A debris separation system as defined in claim 8 wherein air chamber adjustable means on the air chamber adjusts the angular position of the opening relative to the cylindrical screen, and conveyor adjustment means is provided for adjusting the conveyor end for selective depositing of materials within said upper quadrant portion of the screen.

10. A method for separating materials of a specified size range as between lighter mass materials and greater mass materials from an admixture of a variety of sizes of such materials, said method comprises;

determining a specified size range and depositing the admixture of materials onto a first size separating apparatus for separating out materials of a size greater than the specified size range, depositing the remainder of the admixture onto a second size separating apparatus for separating out materials of a size smaller than the specified size range, and depositing the remainder of the admixture of specified size range onto a cylindrical screen rotating about its cylindrical axis, said depositing of the materials being at a selected position in an upper quadrant of the screen wherein the screen moves in a curved path from a vertical to a horizontal position, said screen having screen openings smaller than said specified size range, said depositing of the admixture being adjustable within the range of said upper quadrant wherein the screen provides increasing support for the material progressing from the vertical to the horizontal position of the quadrant, and directing air flow through the screen at the area of said upper quadrant for urging the materials into contact with the rotating screen to be carried by the screen over the screen path apex, said air flow selected in conjunction with the selected position for deposit of materials on the screen to overcome gravity pull of the lighter materials of specified size range to thereby be carried by the screen to be deposited for collection on the screen side following the screen apex, and said air flow in conjunction with the selected position for deposit of materials on the screen selected to be inadequate to overcome gravity pull of the materials of greater mass to be thereby deposited for collection on the screen side prior to the screen apex.

11. A method as defined in claim 10 wherein; the admixture is a mixture of rock, gravel, dirt and wood debris compiled from a lumber mill yard, determining the size range of wood debris best suited for wood burning, separating out materials larger and smaller than said selected size range to include noncombustible rock of heavy mass and combustible wood material of a relatively lighter mass, and adjusting the position of deposit on the screen and the flow of air through the screen to induce adherence of the wood material only against the screen to be carried through the air flow and over the screen path apex, and blocking the air flow through the screen at its downward movement for release of the wood material into a collection station.

12. A method as defined in claim 11 wherein the moving screen is cylindrical and is rotated around its longitudinal axis, said mixture of selected size range being deposited on the screen preceding its movement over the apex within a 60 degree angular range preceding the apex.

* * * * *